Feb. 27, 1934.  F. F. EMORY  1,948,654
OIL FILTER
Filed July 25, 1932

Inventor
Francis F. Emory,
By Irving L. McCathran
Attorney

Patented Feb. 27, 1934

1,948,654

UNITED STATES PATENT OFFICE 1,948,654

OIL FILTER

Francis F. Emory, Leominster, Mass.

Application July 25, 1932. Serial No. 624,556

2 Claims. (Cl. 210—43)

This invention relates to an improved oil filter, and the principal object of this invention is to provide a filter which is so constructed that waste oil of any character may be thoroughly cleaned and purified and thus again made fit for use.

The present invention is an improvement upon prior Patent #1,148,834, relating to Oil filters, and issued on August 3, 1915.

A further object of this invention is the production of a simple and efficient means for drawing off the oil from the container so as to prevent the filter from becoming unfit for use.

A still further object of this invention is the production of a simple and efficient means for facilitating the separation of the oil from the water.

Another object of this invention is the production of a simple and efficient means for facilitating the adjustment of the water outlet by changing the height thereof to accommodate itself to the specific gravity of the oils within the container.

With these and other objects in view, this invention consists in certain novel constructions, combinations and arrangements of parts as will be hereinafter described and claimed.

Figure 6:
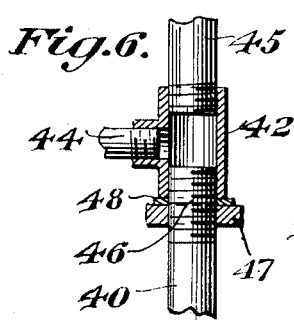
Figure 5:
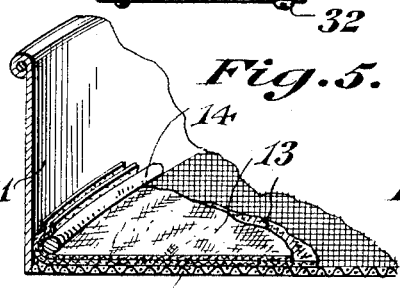

Figure 5 is a detail sectional perspective view of a portion of one of the straining pans showing the manner of supporting the straining cloths in the bottom thereof; and Figure 6 is a vertical sectional view through the outer discharge end of the water drain pipe showing the adjusting nut for raising and lowering the water discharge elbow to permit the discharge portion of the water discharge pipe to be adjusted to take care of oils of various specific gravity within the main container.

Figure 1:
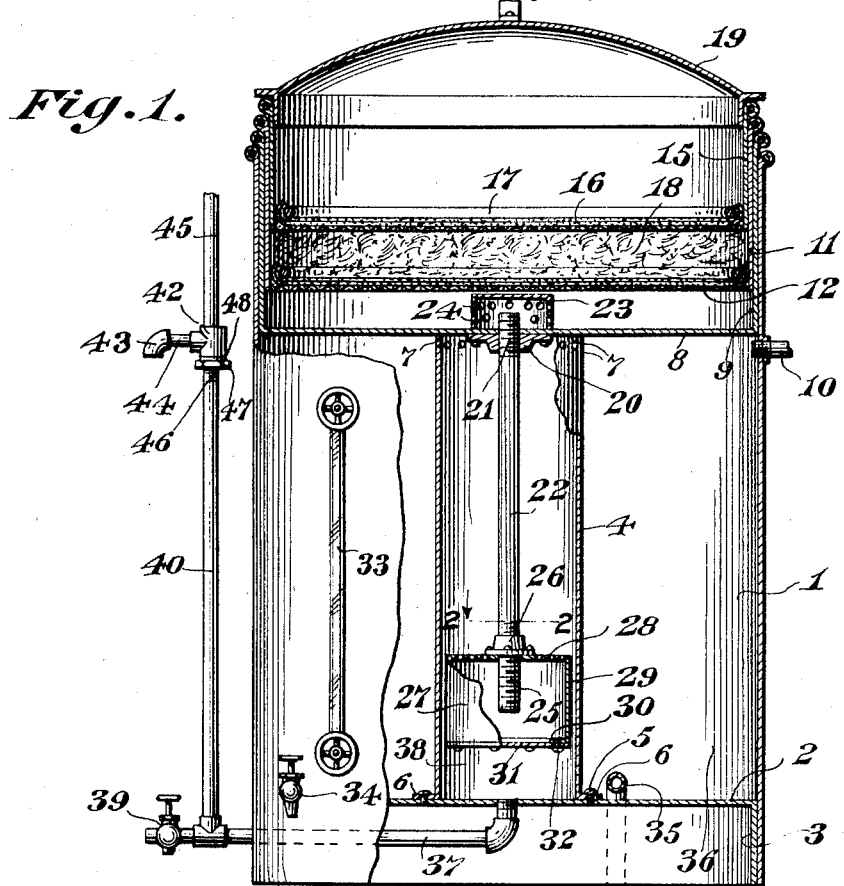
Figure 1 is a vertical sectional view through the filter, certain portions thereof being shown in side elevation.
Figure 2:
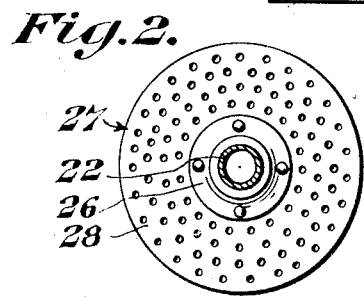
Figure 2 is a section taken on line 2—2 of Figure 1.
Figure 4:
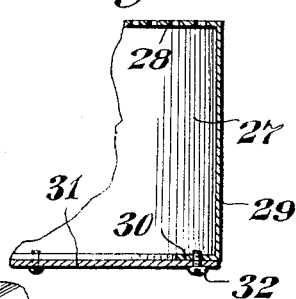
Figure 4 is a section taken on line 4—4 of Figure 3.
Figure 3:
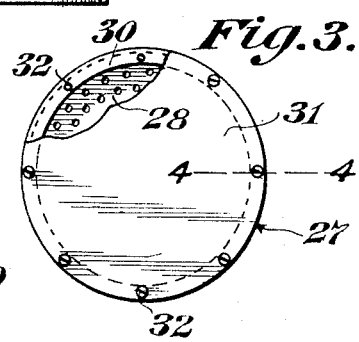
Figure 3 is a bottom plan view of the oil and water breaking casing.

By referring to the drawing, it will be seen that 1 designates the main body or container of the filter which is provided with a bottom 2 which bottom is secured to the inner face of the body of the container through the medium of the depending flange 3. Mounted upon the bottom 2 is a vertically extending centrally located cylinder 4 which may be secured in any suitable or desired manner to the bottom, as for instance by means of rivets 5 passing through the flange 6. This centrally located cylinder 4 is provided with a series of oil outlet apertures 7 at the extreme upper end thereof and the upper extremity of the cylinder 4 may be fixedly secured to the bottom of the first pan 8, as shown in Figure 1, by means of solder, welding, or in any other manner common to the trade. The first tray 8 may be secured in any suitable or desired manner and fitted within the body or container 1 by having the upwardly extending flange 9 thereof snugly fit against the inner wall of the container 1. The body or container 1 carries an overflow pipe 10 at a point just below the bottom of the first pan or tray 8, as shown in Figure 1, to carry off the overflow from the container or body 1 into a suitable tank, pail, or other receptacle.

Mounted within the first pan or tray 8 is a second pan or tray 11 which carries a wire fabric bottom 12 upon which is preferably mounted a cheesecloth or felt straining cloth 13, and this straining cloth 13 may be of any suitable or desired number of plies and is held firmly in position by means of the suitable clamping hoop 14. The wire bottom 12 is preferably of a fine brass or tinned steel wire and the hoop 14 is preferably made of spring steel to firmly clamp the straining cloth 13 in position. Mounted above the said pan or tray 11 is a third pan or tray 15 similarly constructed to that as described with respect to the second tray 11, and this tray 15 is preferably arranged in spaced relation to the second tray 11, and is provided with a suitable straining cloth 16, such as is described with respect to the tray 11, the straining cloth 16 being held in position by the retaining hoop 17. Each of the trays or pans 8, 11, and 15, is provided with a rolled upper edge to facilitate the holding of the tray or pans in position. As is provided in my previous Patent #1,148,834, a suitable filtering substance 18 may be placed in between the trays 15 and 11. A cover 19 may also be provided for the upper end of the body 1.

The bottom of the first pan or tray 8 carries an enlarged sleeve 20 through which is extended the elongated threaded end 21 of a depending drain pipe 22. A shield cap 23 is carried by the pan or tray 8 and extends over the upper end of the pipe 22, as shown, and this shield cap 23 is preferably provided with a plurality of apertures 24 upon the sides thereof, the upper end of the pipe 22 being spaced from the upper end of the cap 23 a desired distance. This pipe 22 may be properly adjusted to its desired position through the medium of the elongated threaded end 21.

The depending drain pipe 22 is also provided with an elongated threaded end 25 at the lower portion thereof, which threaded end passes through an internally threaded collar 26 carried by the oil breaking casing 27, the pipe 22 constituting means for suspending the oil breaking casing 27 in the lower end of the cylinder 4 and in spaced relation from the bottom 2. This casing 27 is provided with a perforated top 28, a closed side wall 29 having an inturned flange 30, and a closed bottom 31 which is secured to the flange 30 by means of suitable securing screws 32 to permit the removal of the bottom plate 31 when desired for the purpose of cleaning or repairing. The lower end 25 of the pipe 22 extends down into the casing 27 a suitable distance and terminates short of the bottom plate 31. This oil breaking casing 27 is adapted to break up the oil and water to facilitate the separation of the oil from the water causing the oil to rise and the water to gravitate toward the bottom of the cylinder 4 when the liquid passes out through the perforated upper end 28 of the casing 27.

A suitable gage 33 is carried by the housing 1 and also a suitable clean out valve is provided at the bottom of the housing. A drain pipe 35 is also provided to drain off the reclaimed oil from the bottom of the container 1 from the compartment 36 thereof.

A water drain pipe 37 is connected to the bottom 2 and communicates with the lower end of the compartment 38 provided by the cylinder 4. The outer end of this pipe 37 carries a valve 39 which may be controlled for drainage purposes if desired and this pipe 37 carries a vertically extending pipe 40 extending upwardly or vertically of the housing or container 1. The pipe 40 carries a T 42, which T in turn supports a water discharge elbow 43 by means of the pipe section 44. An air-vent pipe 45 is carried by the upper end of the T 42. The pipe 40 is provided with a threaded portion 46 upon which is adjustably mounted an adjusting nut 47 supporting the lower end of the T 42 on a suitable sealing washer or bushing 48. By adjusting the nut 47 vertically upon the threaded portion 46 of the pipe 40, the T 42 may be raised or lowered to accommodate itself to drain off the water from the compartment 38 according to the specific gravity of the oils within the filter. The specific gravity of the oil will change only a very slight amount and naturally this adjustment need only be quite slight.

From the foregoing description it will be seen that a very efficient and simple filter has been produced and the important features of the invention reside in the adjustment of the T 42, the construction and arrangement of the casing 27, the cap 23, and the means for holding the filtering cloths in position within the respective trays. These in conjunction with the various vent means, provide important improvements over my previous patent above mentioned.

It should be understood that certain detail changes in the mechanical construction may be employed without departing from the spirit of the invention, so long as these changes fall within the scope of the appended claims.

Having described the invention, what is claimed as new is:—

1. A filter of the class described comprising a body, filtering means carried thereby, a supporting pan associated with said filtering means, a perforated cap carried by said supporting pan between its bottom and said filtering means, a casing, a depending drain pipe extending downwardly from said pan with its upper end extending through the bottom of said pan and guarded by said cap, adjustably supported upon the lower end of said drain pipe and having a perforated upper end to facilitate the separation of water and oil passing into said casing, a cylinder surrounding said casing for dividing said body into inner and outer compartments, means for draining water from the inner compartment, said cylinder provided with means for permitting the passing of oil from the inner to the outer compartment, and means for drawing off oil from said outer compartment.

2. A filter comprising a body having a bottom and side walls and open at its top, a cylinder rising from the bottom of said body and defining inner and outer chambers in the body, a pan in the upper portion of said body resting upon and closing the upper end of said cylinder, the cylinder having side openings adjacent its upper end constituting ports opening into the outer chamber, filtering means in said pan spaced from the bottom thereof, a perforated shield in said pan between its bottom and said filtering means, a drain pipe extending downwardly from said pan with its upper end extending through the bottom of the pan and guarded by said shield, said pipe extending longitudinally in said cylinder and having a threaded lower end portion spaced from the bottom of the inner chamber, and a casing threaded upon the lower portion of said pipe and having a perforated top and imperforate walls and bottom.

FRANCIS F. EMORY.